No. 789,116. PATENTED MAY 2, 1905.
W. BROUGH.
SEED MEASURING MACHINE.
APPLICATION FILED APR. 8, 1904.
6 SHEETS—SHEET 1.
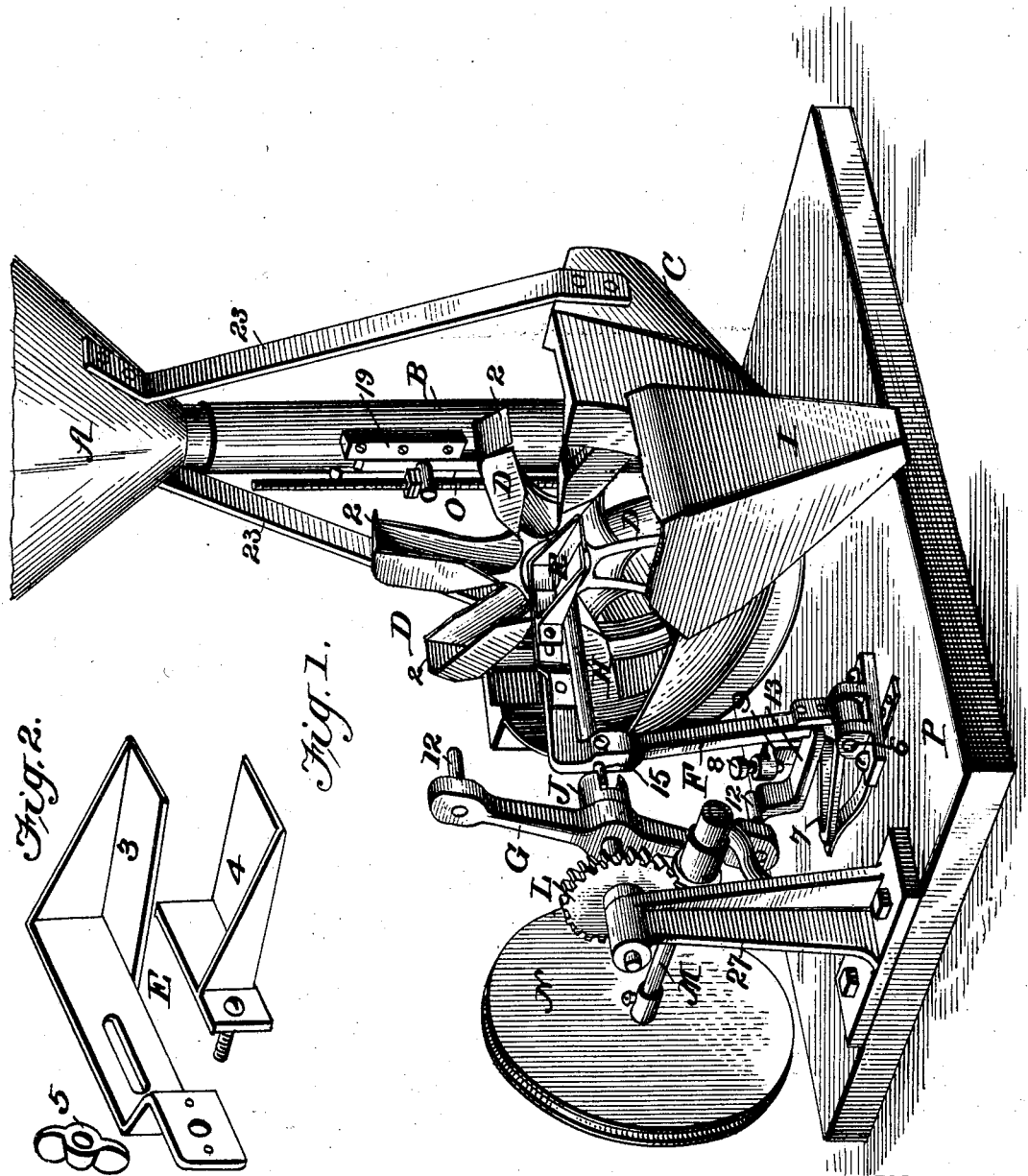
WITNESSES:
Jos. A. Ryan
Amos W Hart
INVENTOR
William Brough
BY Munn & Co.
ATTORNEYS

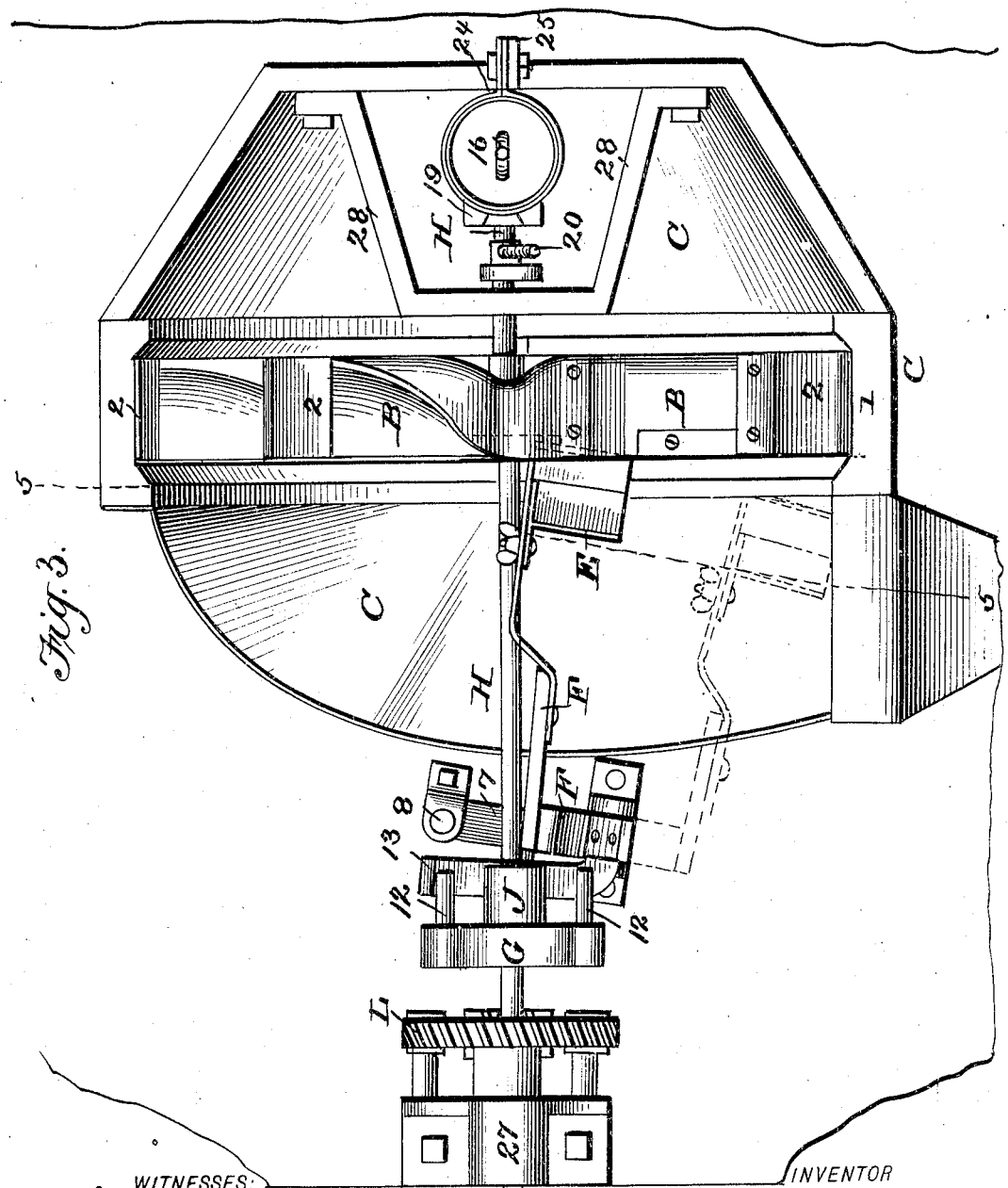

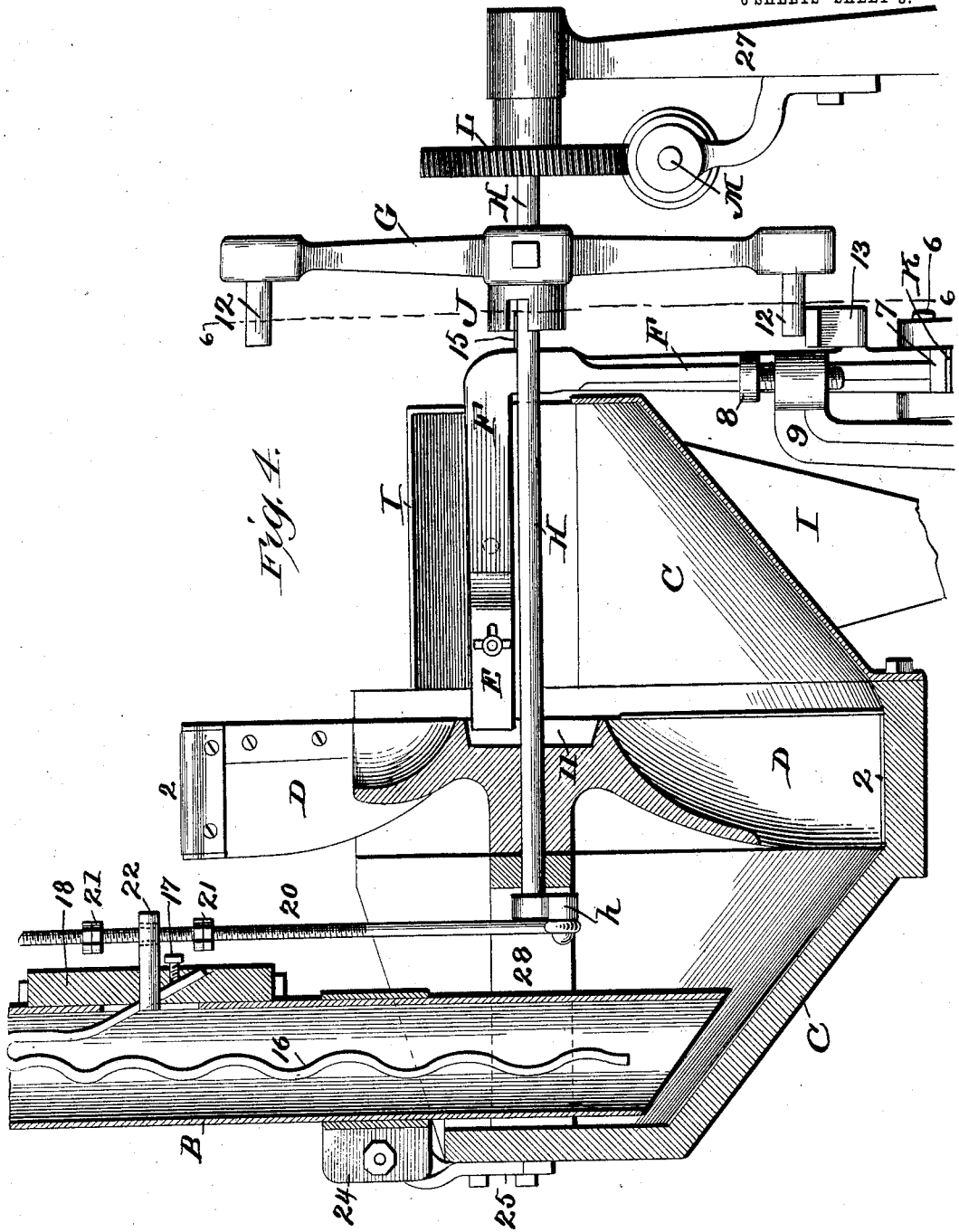

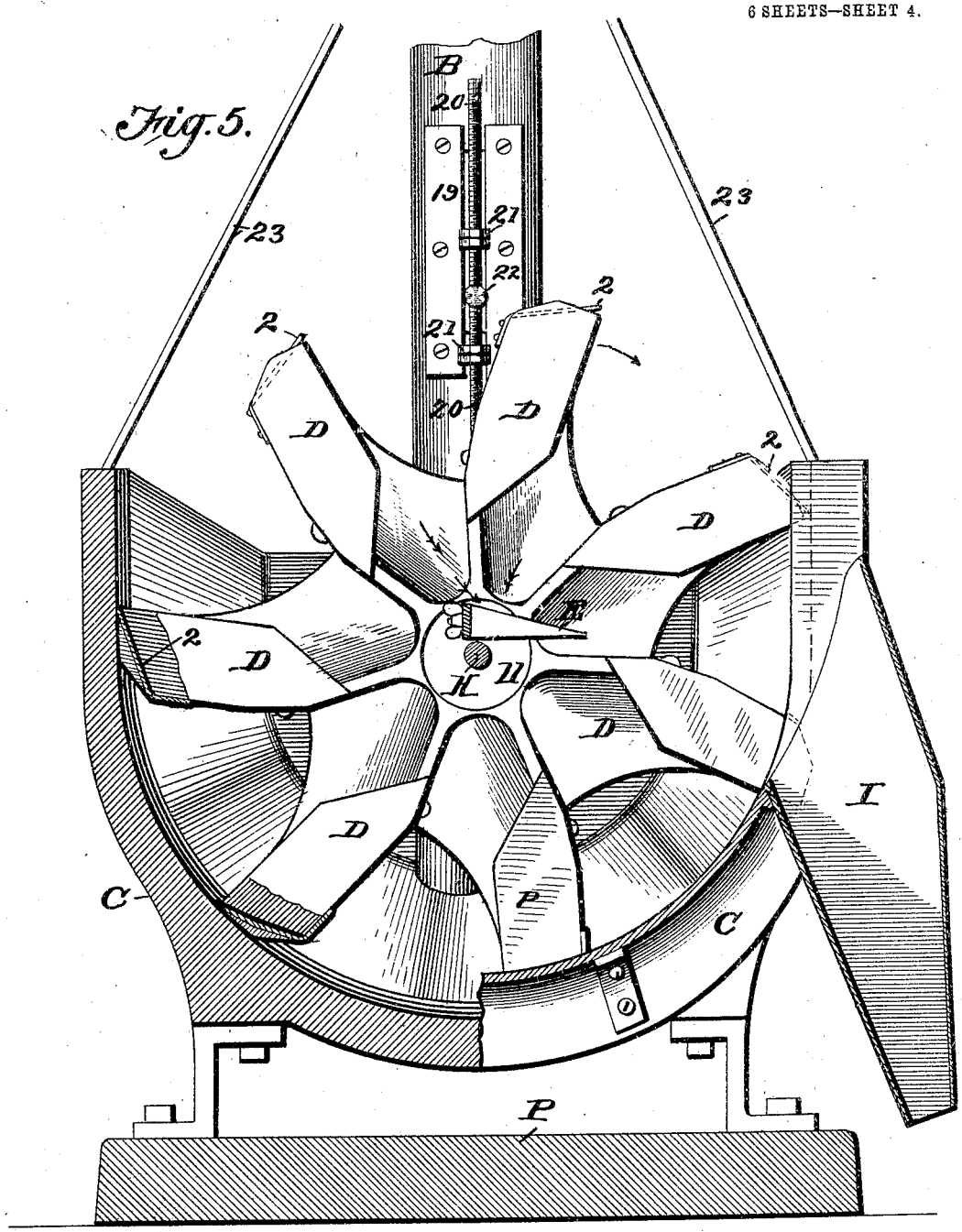

No. 789,116. PATENTED MAY 2, 1905.
W. BROUGH.
SEED MEASURING MACHINE.
APPLICATION FILED APR. 8, 1904.

6 SHEETS—SHEET 5.

WITNESSES:
Jos. A. Ryan
Amos W. Hart

INVENTOR
William Brough.
BY Munn & Co.
ATTORNEYS

No. 789,116. PATENTED MAY 2, 1905.
W. BROUGH.
SEED MEASURING MACHINE.
APPLICATION FILED APR. 8, 1904.

6 SHEETS—SHEET 6.

WITNESSES:
Jos. A. Ryan
Amos W. Hart

INVENTOR
William Brough.
BY Munn & Co.
ATTORNEYS

No. 789,116.                                                                    Patented May 2, 1905.

UNITED STATES PATENT OFFICE.

WILLIAM BROUGH, OF BALTIMORE, MARYLAND, ASSIGNOR, BY DIRECT AND MESNE ASSIGNMENTS, TO BURT MACHINE COMPANY, OF DELAWARE, A CORPORATION OF DELAWARE.

SEED-MEASURING MACHINE.

SPECIFICATION forming part of Letters Patent No. 789,116, dated May 2, 1905.

Application filed April 8, 1904. Serial No. 202,154.

*To all whom it may concern:*

Be it known that I, WILLIAM BROUGH, a citizen of the United States, and a resident of Baltimore, in the State of Maryland, have made certain new and useful Improvements in Seed-Measuring Machines, of which the following is a specification.

The object of my invention is to provide an improved automatic machine for measuring seeds or granular material and delivering the same to bags or other receptacles. I have aimed at compactness, durability, simplicity, and economy of construction and also at convenience of adjustment of certain parts for varying the quantity or charge of seeds or other material measured and delivered at a given time.

The details of construction, arrangement, and operation are as hereinafter described, reference being had to the accompanying drawings, in which—

Figure 6:
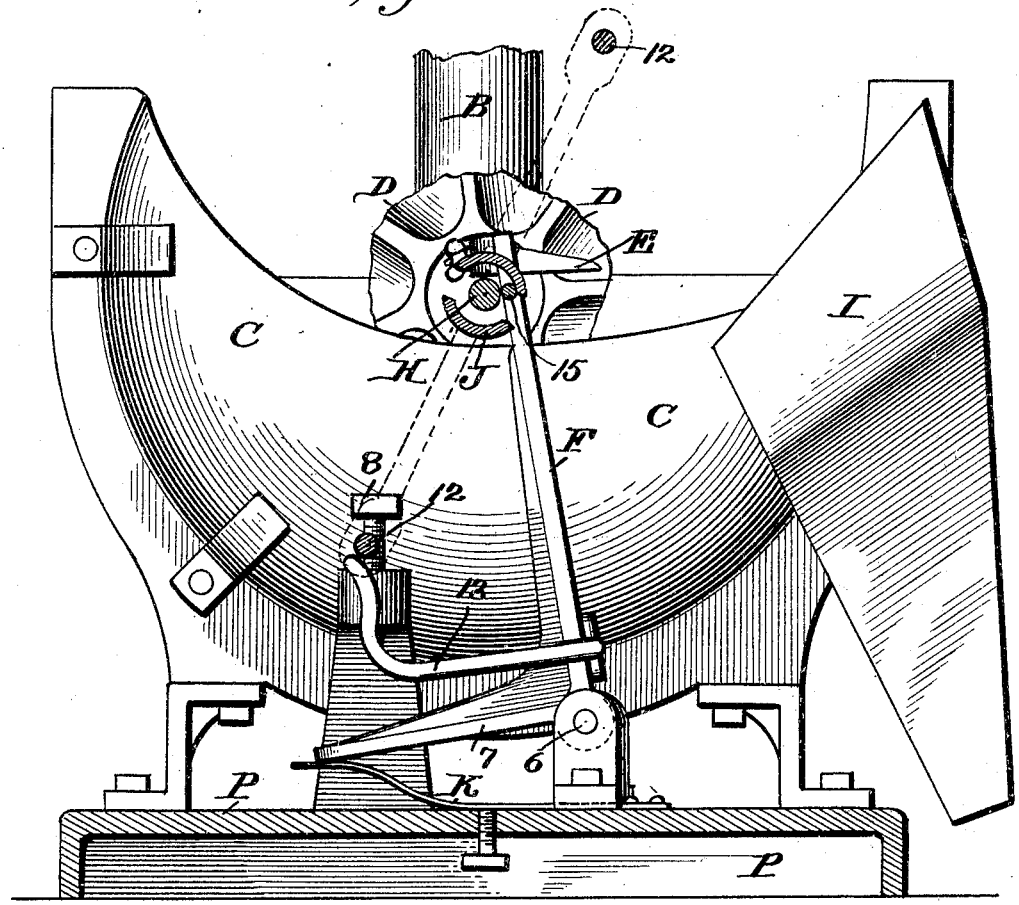
Figure 7:
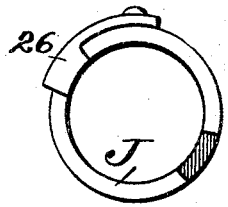
Figure 8:
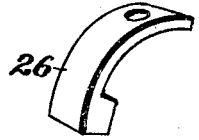
Figure 9:
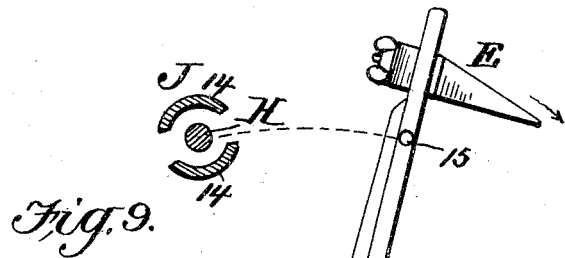
Figure 10:
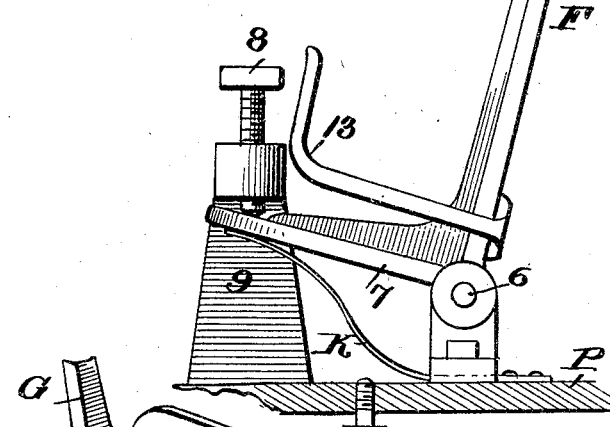

Figure 1 is a perspective view of the entire machine. Fig. 2 is a perspective view of the different portions of the charge-carrier separated or disassociated from each other. Fig. 3 is a plan view of the machine. Fig. 4 is in part a side view and in part a vertical longitudinal section of the machine. Fig. 5 is a vertical section mainly on the line 5 5 of Fig. 1. Fig. 6 is a vertical section on the line 6 6 of Fig. 4. Figs. 7 and 8 are detail views of parts which will be hereinafter referred to. Fig. 9 is a view illustrating the construction of the charge-carrier and its swinging support. Fig. 10 is a perspective view of the carrier, together with a portion of the wiper or rotating lever by which it is moved in one direction.

I will first indicate the main portions of the machine as seen in Fig. 1. The seed or other material which is to be measured and delivered into bags or other receptacles is first deposited in the hopper A and conveyed thence by the vertical tube B into a receiving-hopper C. Within the latter is arranged to revolve a device D, consisting of a series of radial buckets or scoops which take up the seeds or other material and deposit the same in the carrier E. The latter forms an attachment of a right-angular lever-arm F, which is acted upon by a rotating wiper G, that forms an attachment of the shaft H, to which the buckets are attached. The wiper swings the carrier back to normal position after discharge into the tapered hopper I, and the carrier is held during a part of the revolution of said shaft by a device J, which forms practically a slotted hub on the wiper G. The carrier is thrown outward or in direction for discharge by a spring K. The shaft H is driven by worm-gear L, operated by a horizontal driving-shaft M, to which a band-pulley N is shown affixed.

The shaft H operates an agitating device, which is located within the vertical hopper-tube B, the said device being connected with the shaft by means of a threaded rod O.

I will now describe the details of construction, arrangement, and operation. All the aforementioned parts are suitably arranged on and attached to a horizontal base or platform P. The receiving-hopper C (see Figs. 3 and 4) is formed with sloping sides converging to a horizontal middle portion 1 and which is provided interiorly with a shallow groove wherein the outer ends of the buckets or scoops D work. As indicated in Fig. 5, these arms are curved slightly longitudinally and their outer portions are formed of pockets or scoops proper, the end portions being a spring-plate 2, whose free end works in contact with the bottom of the groove in the receiving-hopper, as will be readily understood. The inner portions of the buckets are open on one side—to wit, the side adjacent to the carrier E. The arms are also curved lengthwise, so that they have practically a spiral shape, and the rear sides are extended or closed, as shown in Fig. 5, while cut away on the front, so that the material taken up by them is discharged at the front and into the carrier C as the buckets successively rise to the required height. The double-headed arrows in Fig. 5 indicate the buckets from which discharge is going on.

The carrier E, as shown in Figs. 1 and 2, is constructed of two parts 3 and 4, which are adjustably connected, so that the carrier may be enlarged and reduced in size according to the quantity of seed or other material required to be discharged at a given time. The two parts 3 and 4 are adjustable laterally, the part 4 being provided with a screw and the part 3 with a slot adapted to receive the same and a wing-nut 5 being applied to the screw for securing the parts in any required adjustment. The carrier forms a fixed attachment of a right-angular arm or lever F, (see Figs. 9 and 10,) which is pivoted at 6 on the platform or base P and provided with a toe or lateral extension 7, against which the spring K acts, as shown in Figs. 1 and 9. In Fig. 9 I show an adjustable screw 8, arranged in a bracket 9 and serving to regulate the throw of the carrier-lever F. It will be noted that the said lever is hinged in such manner that the carrier E swings in a direction slightly inclined to the face of the buckets or bucket-wheel D. (See especially Fig. 3.) As shown best in Fig. 4, the hub or inner portion of the buckets D is recessed at 11 concentrically with the shaft H and serves to accommodate the carrier E when returned to its normal position. In other words, the carrier is thus adapted to be placed in such relation to the face of the buckets D that their contents will discharge into it with greater certainty and no seed or other material can find its way or wedge between the carrier and the hub of the buckets.

The throw of the carrier E is indicated by dotted lines, in Fig. 3, and since its fulcrum 6 is at a point intermediate of the driven shaft H and the discharge-spout I the receiver is inclined downward sufficiently to cause discharge of its contents when it reaches the position indicated by dotted lines. As before intimated, this throw is occasioned by the action of the spring K. The means for readjusting the carrier or returning it to normal position (indicated in Fig. 1 and by full lines in Figs. 3 and 6) is the wiper or two-armed lever G, which forms a fixed attachment of the shaft H and is provided at its ends with lateral pins 12, that act successively upon an angular lever-arm 13, (see Fig. 10,) forming a rigid attachment of the carrier-lever F. In other words, at each revolution of the shaft H the wiper G acts twice upon the lever-arm 13 and each time swings the carrier E back to its normal position against the opposing tension of the spring K. When the pins 12 of the wiper G pass out of contact with the bent lever-arm 13, the holder J comes into action. This, as shown in several figures, is practically a slotted hub forming an attachment of the wiper G and the shaft H. As shown in Fig. 9, it consists of two semicircular or arc-shaped portions 14, which are arranged opposite each other and provided with opposite notches or slots. As illustrated in Fig. 1, the lower pin 12 of the wiper-lever G is just leaving the free end of the angular lever-arm 13, and a pin 15, projecting from the head of the carrier-lever F, is just entering the holder J, so that the latter will retain the carrier in the normal position until the said pin 15 reaches the opposite slot, when it will be released and the spring K will throw the carrier over to the dotted position indicated in Fig. 3. After a momentary pause the wiper G again comes in contact with the lever-arm 13 and forces the carrier E back to its normal position. Thus the pins 12 of the wiper G act alternately on the curved portion of the holder J, and the pin 15 of the carrier-lever F enters and leaves the retainer at each half-revolution of the wiper.

While the downward inclination of the carrier E at the end of its throw ordinarily suffices to cause discharge of its contents, it is to be noted that this operation is aided by the sudden impact or contact of the lever arm or toe 7, forming an attachment of the lever F, with the stop-screw 8. In other words, the shock due to impact aids in effecting discharge of the contents of the carrier if the same tends from any cause to become wedged or otherwise stick therein.

Within the hopper-discharge tube B (see Fig. 4) is arranged a reciprocating agitator 16, which consists of a sinuous wire or rod whose shorter arm is secured by a clamp-screw 17 to a slide-bar 18, arranged between guides 19, forming an exterior attachment of the said tube B. This slide is reciprocated by a screw-threaded rod 20, which is attached to a crank 21, forming an attachment of the driven shaft 8. The limits of the throw or reciprocating movement of the agitator 16 are determined by the adjustment of nuts 21 on the rod 20, these being arranged on opposite sides of a pin 22, forming an attachment of the slide 18. The receiving-hopper A (see Fig. 1) is supported by rigid bars 23, forming a permanent attachment of the receiving-hopper C. The discharge-tube B may be adjusted vertically, as required to regulate discharge of its contents into the hopper C, by means of a band 24, (see Fig. 4,) which is, in effect, a screw-clamp permanently attached to the hopper at 25, as shown.

It is sometimes desirable to reduce the number of throws or oscillations of the seed-carrier E—as, for instance, when a large quantity of seed is to be bagged at each throw. In such case one of the slots of the retainer J may be closed by a device 26, (see Figs. 7 and 8,) which is a curved metal piece having an enlarged head and adapted to be secured by a screw to the body of the retainer. The said head fills one of the slots, as shown in Fig. 7, and thus the pin 15 of the carrier-lever F is held in the retainer J during nearly an entire revolution of the latter.

The main shaft H is supported in bearings provided by a vertical standard 27 (see Figs. 1, 3, 4) and a horizontal bracket 28, forming an attachment of the cast-metal portion of the receiving-hopper C, which is supported on the base P, as shown in Fig. 3.

What I claim is—

1. The combination, with a receptacle for the material to be bagged, of a rotatable member for raising and discharging said material, a movable carrier operating opposite the face of the said member, and means connected with the carrier for actuating the same and alternately holding and releasing it, substantially as described.

2. The combination of a series of rotatable buckets for taking up material and having a lateral discharge, a movable carrier into which the discharge is directed, and means for actuating the carrier substantially as described.

3. The combination, with buckets for taking up material, the same acting in a vertical plane and having a lateral discharge, of a carrier which swings in a plane practically parallel to that of the buckets, substantially as described.

4. The combination, with a receptacle for the material and a series of buckets rotating in a vertical plane and having a lateral discharge adjacent to their axis, of a carrier adapted to swing in a plane which is practically parallel to the face of the buckets, substantially as described.

5. The combination, with a receptacle for material, of a series of rotatable buckets working in said receptacle and adapted for taking up the material, the buckets having a lateral discharge adjacent to their axis, and a recess provided between the discharge and said axis, the same being formed in the hub of the buckets, and a movable carrier which, when in normal position, enters the said recess for receiving the discharge from the buckets, substantially as described.

6. The combination, with a receptacle for material, of a series of rotatable buckets working in said receptacle and adapted for taking up the material, the buckets having a lateral discharge adjacent to their axis and a recess provided between the discharge and said axis, the same being formed in the hub of the buckets, a movable carrier which enters said recess when in the position for receiving the material discharged from the buckets, and means for holding the carrier in such position and releasing it to allow discharge of its contents, substantially as described.

7. The combination, with a series of buckets having lateral discharge and rotating in a vertical plane, a horizontal shaft upon which the same are mounted, of a swinging carrier pivoted and adapted to receive the lateral discharge of the buckets, means for holding it temporarily in such position and then releasing it, and means for throwing the carrier to discharge its contents, and means for returning the same to its normal position, substantially as described.

8. The combination, with a receiving-hopper, a series of rotating buckets and a horizontal shaft upon which they are mounted, a carrier for the material taken up by the buckets, and a pivoted lever to which the carrier is attached, the same being provided with horizontal arms as described, a spring acting upon one of said arms for throwing the lever outward to discharge its contents, a rotating device which coacts with the other arm for returning the carrier to its normal position, and a device for retaining the carrier in said position and then releasing it when filled, substantially as described.

9. The combination, of a receptacle for material, a series of devices for taking up such material and discharging it, an oscillating carrier which receives a charge of the material and discharges it alternately, a tappet-arm forming an attachment of said carrier, a wiper which coacts with said arm for returning the carrier to its normal position, substantially as described.

10. The combination, with a horizontal shaft, and a receptacle for material, of a series of buckets arranged radially in a vertical plane and keyed upon said shaft, a carrier which receives the discharge of the buckets and swings practically in a plane parallel to their face, a tappet-arm forming an attachment of said lever, a rotating wiper mounted on the aforesaid shaft which coacts with said tappet-arm for returning the carrier to its normal position, a retainer for the carrier consisting of a slotted hollow hub mounted on said shaft and adapted to receive and engage a projection of the carrier-lever, and a spring for throwing the said lever laterally to effect discharge of the contents of the carrier, substantially as described.

11. The combination, with a horizontal rotary shaft, a receptacle for the material, and a series of rotating buckets having a lateral discharge adjacent to the axis, of an oscillating carrier for receiving the material taken up by the buckets, a lever carrying the carrier and provided with a lateral projection, a device which alternately engages and releases said projection, and means for actuating the lever in both directions, substantially as described.

12. The combination, with a horizontal rotary shaft, a receptacle for material, and a series of buckets mounted on said shaft and rotating in the said receptacle, their hub being provided with a recess, of a carrier adapted to enter said recess and thus lie, when in normal position, within the face of the buckets, a lever supporting the carrier and having a fulcrum arranged at an angle to the plane of the buckets, whereby the throw of the carrier is at a greater or less angle to the face of the buckets, and means for actuating the carrier in both directions and alternately holding and releasing the same, substantially as described.

13. The combination, with a horizontal rotary shaft, a receptacle for material, and a series of buckets mounted on the shaft, of a carrier having a pivoted lever which supports it and is adapted to swing in a plane practically parallel to the face of the buckets, an arm constituting an adjustable stop for contact with said arm to regulate the throw and point of discharge of the carrier, and means for actuating and alternately holding and releasing the carrier, substantially as described.

14. The combination, with a receptacle for material to be measured, of a take-up and discharger, comprising a rotary shaft arranged horizontally, and a rotatable member attached to said shaft and radial thereto, the same being constructed at its outer end in scoop form and its body portion being provided with a passage for the material taken up and at a point between the outer end and the shaft with a discharge-opening which is on the side of said member so that the material discharges in a direction, practically, at right angles to the plane of the rotation of said member and at a point removed from the shaft, substantially as described.

15. The combination, with a receptacle for material whose lower portion is constructed upon the arc of a circle, of one or more rotating buckets having their outer ends constructed as scoops and provided with spring-scrapers adapted to work in contact with the concentric portion of the receptacle, substantially as described.

16. In a machine of the character described, the combination, with a horizontal crank-shaft, a receiving-hopper for the material to be bagged, a series of buckets mounted on said shaft and rotating in the said receptacle, a tube through which the material is fed into said receptacle, an agitator arranged in the said tube, and means connecting it with the crank-shaft whereby the agitator is operated by the latter, substantially as described.

17. In a machine of the character described, the combination, with a receptacle for material and means for taking up the latter, of a rotary crank-shaft and a vertical tube through which the material enters the hopper, the tube having a lateral slot, an agitating device arranged in the tube, and a slide exterior to the latter with which said device is connected, a screw-threaded rod connected with the crank-shaft and provided with nuts for regulating the throw of the agitator, substantially as described.

18. In a machine of the character described, the combination, with a receiving-hopper, a rotary crank-shaft, and means for taking up the material, of a tube through which the material is conveyed to the hopper, an agitator arranged within the tube and formed of a sinuous wire, and means connecting it with the crank-shaft whereby it is reciprocated in the manner described.

WILLIAM BROUGH.

Witnesses:
D. ARDIN CARRICK,
HENRY W. STANGE.